No. 631,033. Patented Aug. 15, 1899.
J. A. WRIGHT & J. H. CURRY.
MIRROR.
(Application filed Feb. 4, 1899.)
(No Model.)
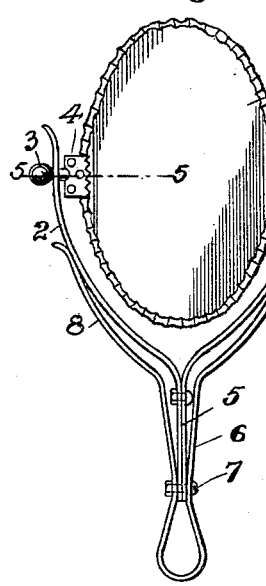
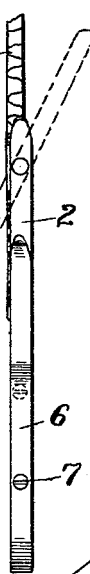
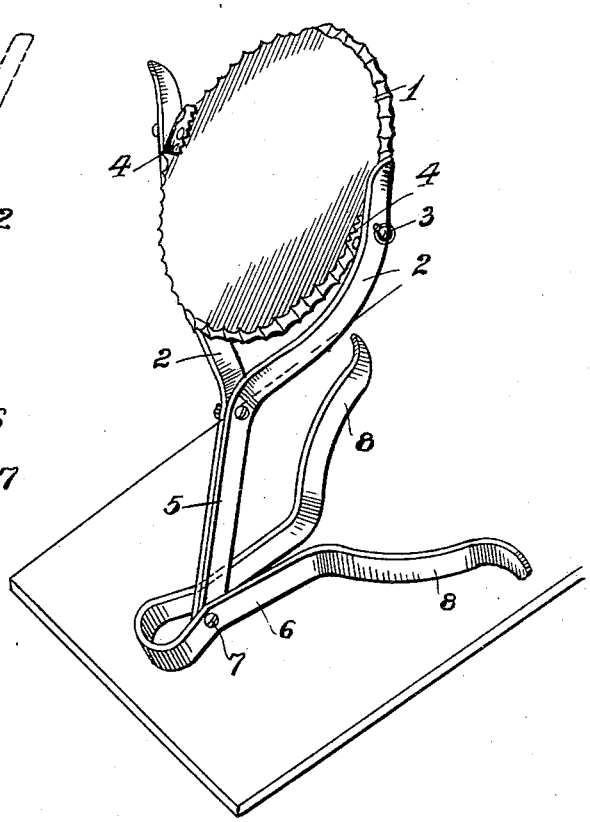
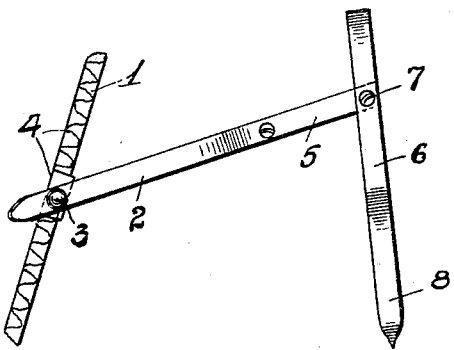
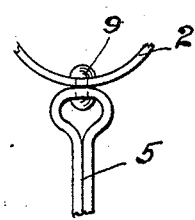
WITNESSES:
William J. Brown
INVENTORS
John A. Wright
Jas. H. Curry
BY
ATTORNEY

UNITED STATES PATENT OFFICE.

JOHN A. WRIGHT AND JAMES H. CURRY, OF WILKINSBURG, PENNSYLVANIA, ASSIGNORS TO THE PENN ELECTRICAL AND MANUFACTURING COMPANY, OF IRWIN, PENNSYLVANIA.

MIRROR.

SPECIFICATION forming part of Letters Patent No. 631,033, dated August 15, 1899.

Application filed February 4, 1899. Serial No. 704,491. (No model.)

*To all whom it may concern:*

Be it known that we, JOHN A. WRIGHT and JAMES H. CURRY, citizens of the United States, residing at Wilkinsburg, in the county of Allegheny and State of Pennsylvania, have invented new and useful Improvements in Mirrors, of which the following is a specification.

This invention relates to mirror-mountings; and the object thereof is to provide a mounting in the form of a folding frame which may be utilized either as a stand or easel for supporting the mirror on a dresser or, when compactly folded, as a handle for constituting the mirror a hand-glass.

A further object is to provide improved means for securing the mirror in its mounting.

The invention consists in the novel structural details and combination of parts hereinafter fully described and claimed and illustrated by the accompanying drawings, in which—

Figure 1 is an elevation of the mirror as a hand-glass; and Fig. 2 is an edge view of the same, showing in dotted lines the glass turned at an angle to the frame. Fig. 3 is a perspective view of the same as a stand-mirror, and Fig. 4 illustrates in elevation another position in which it may be arranged. Fig. 5 is a cross-section on line 5 5 of Fig. 1. Fig. 6 is a detail view of the mirror-frame stem provided with a swivel.

1 designates the mirror or glass, which may be oval, square, rectangular, or of any other preferred shape, and 2 is a forked spring-metal frame, in which the glass is mounted for adjustment to any desired angle by means of trunnions 3 and clips 4, the latter embracing the back and beveled surfaces of the glass and being held in tight engagement therewith by constant pressure of the frame-arms. Said frame is here shown formed of two parts, which jointly constitute stem 5. The extremity of the stem is tightly clamped between the sides of double spring-metal handle 6 by pivot-screw 7. The handle has diverging extremities 8, adapted to embrace frame 2 when in adjustment for hand-glass use, as in Figs. 1 and 2. When thus folded, stem 5 is inclosed by handle 6, the frictional engagement of the same and of extremities 8 with frame 2 retaining the parts in adjusted position.

To form a stand-glass, frame 2 is raised from handle 6, and the latter constitutes a supporting foot or base, as in Fig. 3. The frictional contact of stem 5 and handle 6 is sufficient to maintain the glass elevated, with frame 2 at any desired degree of inclination. Stem 5 may be constructed with swivel 9, Fig. 6, to permit the glass being turned laterally. The glass and its folding mounting are also capable of the stand arrangement shown in Fig. 4, with the glass and foot members in substantially upright position, with frame 2 as the horizontal connection.

Whether used as a hand or as a stand mirror the glass may be turned in frame 2 either backward or forward, at the convenience of the user, the constant inward pressure of arms 2 holding it in desired adjustment.

As there is only frictional engagement between the glass and clips 4, the former may be removed by sufficiently springing frame 2. Thus the glass may be secured centrally in the frame or above or below the center, and glass of different shape may be substituted at any time; also, broken glass may be readily replaced.

The beveled glass has wedging action in the tapering or V-shaped sockets of the clips, the extent thereof depending on the pressure of spring-frame 2. The hold is, however, very secure on account of this wedging tendency and eliminates all danger of slipping or accidental displacement of the glass. The hold of the clips is, as before stated, entirely on the back and bevel of the glass, so that the reflecting-surface is not encroached upon by the sustaining means.

Having thus fully described our invention, what we claim as new, and desire to secure by Letters Patent, is—

1. The combination of a mirror, a frame therefor having a stem, and a handle pivoted to the stem and corresponding in outline to the stem and frame, whereby the handle is folded to parallel the stem and frame for hand use, and for stand use is adapted to turn at an angle to the stem and frame to constitute a foot, substantially as shown and described.

2. The combination of a mirror, a forked frame therefor having a stem, and a double elongated handle, the stem being pivoted to the handle, with the extremities of the latter diverging to embrace the forked mirror-frame for hand use, the handle being adapted to turn at an angle to the mirror-frame to form a supporting-foot, substantially as shown and described.

3. In a mirror, the combination of a glass, a spring-metal frame normally narrower than the glass, clips 4 grooved on their inner edges and having fixed rotatable mounting in the frame sides, the grooved clips being adapted, upon expansion of the frame, to embrace and frictionally hold opposite edges of the glass at any desired point in the length of the latter, substantially as shown and described.

4. In a mirror, the combination of a glass, an expansible spring-metal frame normally narrower than the glass, and clips on opposite sides of the frame adapted, upon expansion of the frame, to embrace and frictionally engage opposite edges of the glass at any desired point in the length thereof, whereby the relative position of the glass and frame may be varied, substantially as shown and described.

5. In a mirror, the combination of a glass having its edges continuous and uninterrupted by apertures or other bearing-points, an expansible spring-metal frame normally narrower than the glass, and clips grooved in the direction of the glass edges, said clips secured to opposite sides of the expansible frame and adapted to embrace the glass edges at any desired point in the length thereof, the clips holding the glass by frictional engagement, substantially as shown and described.

6. In a mirror, the combination of a glass having beveled or tapering edges, a frame, clips for securing the glass to the frame, the clips having V-shaped sockets for embracing the back and bevel of the glass without encroaching on the reflecting-surface thereof, and means for frictionally holding the clips at any desired point on the glass edges, the latter having wedging action in the clip-sockets, substantially as shown and described.

In testimony whereof we have hereunto set our hands in presence of two subscribing witnesses.

JOHN A. WRIGHT.
JAMES H. CURRY.

Witnesses:
W. F. SHROYER,
T. H. HAZLETT.